United States Patent [19]

Gee et al.

[11] Patent Number: 5,646,340
[45] Date of Patent: Jul. 8, 1997

[54] ANALYTICAL TACHOMETERS

[75] Inventors: Bernard Gee, JG Oude Niedorp; Christiaan Hoede, TN Amsterdam, both of Netherlands; Alastair J. Hotchkiss, Norfolk, United Kingdom; Barbara L. Jones, Norfolk, United Kingdom; Paul Smith, Norfolk, United Kingdom

[73] Assignee: Sun Electric U.K. Limited, Norfolk, England

[21] Appl. No.: 590,315

[22] Filed: Jan. 23, 1996

[30] Foreign Application Priority Data

Jan. 24, 1995 [GB] United Kingdom ............... 9501380

[51] Int. Cl.$^6$ .................................................. G01M 15/00
[52] U.S. Cl. ................. 73/116; 73/506; 73/579; 340/441; 364/431.07
[58] Field of Search ............... 73/115, 116, 117.2, 73/117.3, 118.1, 506, 509, 510, 579; 340/441; 364/431.07; 123/436

[56] References Cited

U.S. PATENT DOCUMENTS

| | | |
|---|---|---|
| 3,090,005 | 5/1963 | McConnell . |
| 3,289,077 | 11/1966 | Miller . |
| 4,002,155 | 1/1977 | Harned et al. . |
| 4,126,045 | 11/1978 | Chou . |
| 4,173,896 | 11/1979 | Takama . |
| 4,328,706 | 5/1982 | Akita et al. . |
| 4,352,293 | 10/1982 | Kurihara et al. . |
| 4,452,079 | 6/1984 | Tiller . |
| 4,577,496 | 3/1986 | Grover et al. . |
| 4,586,369 | 5/1986 | Vogler ........................ 73/117.3 |
| 4,643,023 | 2/1987 | Capps . |
| 4,683,542 | 7/1987 | Taniguti . |
| 4,758,964 | 7/1988 | Bittner et al. . |
| 4,980,844 | 12/1990 | Demjanenko et al. . |
| 4,988,979 | 1/1991 | Sasaki et al. . |
| 4,995,257 | 2/1991 | Leon ............................ 73/116 |
| 5,109,700 | 5/1992 | Hicho . |
| 5,119,783 | 6/1992 | Komurasaki ................... 73/117.3 |
| 5,151,654 | 9/1992 | Krzywicki et al. . |
| 5,205,258 | 4/1993 | Hashimoto et al. . |
| 5,216,881 | 6/1993 | Anlauf et al. . |
| 5,250,896 | 10/1993 | Mieczkowski et al. . |
| 5,287,737 | 2/1994 | Osawa et al. ................. 73/117.3 |
| 5,452,699 | 9/1995 | Rossignol .................... 73/117.3 |

FOREIGN PATENT DOCUMENTS

| | | |
|---|---|---|
| 4221035 | of 0000 | Germany . |
| 604177 | of 0000 | Switzerland . |
| 2154775 | of 0000 | United Kingdom . |

OTHER PUBLICATIONS

Kent–Moore, model J–38792, Electronic Vibration Analyzer, contained in GM service manual, pp. 2–9 –2–18, undated.

Primary Examiner—George M. Dombroski
Attorney, Agent, or Firm—Emrich & Dithmar

[57] ABSTRACT

Method and apparatus for engine and rotary machine analysis provides a vibration sensor adapted to produce a plurality of superimposed waveforms corresponding to engine or machine operating parameters including rotational speed. The signals are transmitted by an RF transmitter/receiver system in analogue modulated form to a data capture and analytical function unit utilising a software sub-system in which a power spectral density plot is produced containing a signature characteristic of the engine or other machine under test. This signature is recognised by a signature detect algorithm which can recognise and trace the signature across the frequency spectrum covered by the apparatus so as to provide a continuous tachometric function not requiring the filtering-out or other removal of irrelevant data. A diagnostic function arises from detection of the presence of additional harmonic peaks within the signature. A capacitive coupling offers a simplified tachometric function based upon low voltage signals in the injector leads to a spark ignition engine.

15 Claims, 5 Drawing Sheets

Typical PSD '1-2-3' signature for a 4 cylinder engine

ANALYTICAL TACHOMETERS

The present invention relates to tachometers suitable for use in maintenance work on automotive engines and like applications. The tachometers described below include features enabling analytical work to be carried out in relation to such engines, such as diagnosis of misfiring faults and the like.

The tachometers to which the invention relates are intended essentially for analytical work, such as in engine maintenance and diagnosis, and it is not presently anticipated that such tachometers would find application by way of permanent installation in any one given vehicle for the indication of engine speed.

So far as measurement of engine speed for automotive applications is concerned, numerous techniques have been developed, including techniques in which signals for RPM measurement have been obtained from the battery, exhaust pressure, exhaust flow, the alternator, the ignition system, and by optical means. All such systems have their own particular applications in which they are effective, and all equally have certain defects which render them less acceptable in areas outside their particular field of utility. We have identified a need for a method and apparatus which has wider utility than some or many of the above-mentioned systems, particularly in terms of a tachometer function of utility for automotive engine maintenance and servicing functions, without limitation to engines of a particular type such as spark ignition.

Examples of prior art tachometer devices are disclosed in:

U.S. Pat. No. 5,250,896 (Mieczkowski et al)
U.S. Pat. No. 4,577,496 (Grover et al)
U.S. Pat. No. 5,151,654 (Krzywicki et al)
U.S. Pat. No. 4,126,045 (Chou)
U.S. Pat. No. 4,173,896 (Takama)
U.S. Pat. No. 4,452,079 (Tiller)
U.S. Pat. No. 5,216,881 (Anlauf et al)
U.S. Pat. No. 3,289,077 (Miller)
U.S. Pat. No. 4,328,706 (Akita et al)

For analytical use and indeed other uses, a tachometer needs to be able to measure and indicate actual engine rotational speed over at least a continuous range of engine speeds from, for example, 1000 to 3000 RPM at a minimum, and preferably the tachometer should cover a significantly wider range of speeds than this, such as 700 to 5000 rpm to a resolution of around 30 rpm. Obviously, in respect of the speed range covered, it is essential that continuous coverage be provided and not an ability to determine engine speeds at particular locations within a given speed range.

Accordingly, an object of the present invention is to provide tachometer apparatus and a corresponding method, particularly applicable to automotive engine analysis applications, offering continuous coverage of at least the minimum band of engine speeds covered by conventional tachometer apparatus, and offering an ability to provide these functions in relation to a wide range of engines by means of a simple connection technique not requiring particular electrical or the like connections to the engine, whereby wide coverage of varying engine types is available. In an embodiment described below there is also provided the advantages of low cost, ease of attachment and low power consumption allowing battery operation and portability.

In accordance with the invention, there is provided tachometer apparatus and a corresponding method, applicable to automotive engine maintenance, servicing and the like. The apparatus comprises vibration sensing means adapted for connection directly to an engine or the like to be analysed, or to structure connected thereto. The vibration sensing means is adapted to generate signals representative of vibrational characteristics of the operating engine. In use, the vibration sensing means produces vibrational signals having characteristics comprising a vibrational signal signature or pattern of a given engine under test. The apparatus is adapted to analyse the vibrational signal signature by reference to a known vibrational signature corresponding thereto, whereby engine speed is determined.

Reference is directed to the following prior patents disclosing analytical apparatus employing vibration sensing devices, namely:

U.S. Pat. No. 5,109,700 (Hicho)
U.S. Pat. No. 4,980,844 (Demjanenko et al)
U.S. Pat. No. 4,683,542 (Taniguti)
U.S. Pat. No. 4,988,979 (Sasaki et al)
U.S. Pat. No. 4,758,964 (Bittner et al)
U.S. Pat. No. 4,352,293 (Kurihara et al)

It is considered that the above Hicho reference is representative of the above-cited group of references. The Hicho specification discloses a vibration transducer mounted to a rotating machine for sensing vibration thereof. An output electrical signal from the transducer is analysed to generate a display of vibrational displacement per unit time, together with a speed display indicative of rotational speed, and a bearing condition display indicative of bearing condition. This apparatus is not tachometer apparatus capable of indicating rotational speed over a continuous range of engine speeds, even of the narrowest proportions. The Hicho apparatus is a vibration analyser adapted to enable monitoring of defects in rotating machines and which incidentally is able to indicate rotational speed at the standard rotational speed settings at which such vibrational analysis are conventionally carried out. Such speed analysis is effected by speed analysis means wherein random or sporadic noise is eliminated, and components of the frequency not related to the rotating speed of the machine are eliminated to obtain an accurate estimation of the machine's running speed. Such an approach is not effective in the case of an engine due to the presence in the vibrational pattern of an engine of multiple peaks many of which are not related to engine speed and there is accordingly considerable difficulty in separating the speed-dependent components from the substantial remainder.

In accordance with the invention, the use of harmonic signature or pattern identification means based upon previous analysis of the vibrational signature of the same or a similar engine configuration enables the characteristic harmonic elements of the signature to be recognised amongst the plethora of additional vibrational peaks, and enables also such identification to be effected throughout a continuous range of engine rotational speeds, and hence the continuous operational characteristics of a tachometer can be obtained.

There is also disclosed in the Kent-Moore J-3872 electronic vibration analyser a low cost diagnostic tool designed to aid in the repair of automotive vibrations. The device is mounted on the dash, suspension, rear axle or any place the vibration can be felt. It displays the three most prominent vibration frequencies. These are displayed in, selectively, cycles per minute or cycles per second. This data permits the possible calculation of the actual rate of rotation of the machine in question but provides no practical assistance in the identification of engine speed from the complex vibrational pattern obtained directly from an automotive engine.

The embodiments of the present invention enable not only the extraction from a complex vibrational pattern of rotational speed, across a range of such speeds, but also there is enabled the identification of anomalies in the vibrational pattern which provide a valuable diagnostic and analytical function additional to that relating to rotational speed, including recognition of patterns due to misfiring and other combustion-related abnormalities. A direct corollary to the mode of operation of the tachometer apparatus of the invention, based as it is upon the recognition of the vibrational harmonic signature of an engine over a range of engine speeds, is the recognition of a known engine vibrational signature from amongst a range of signature possibilities, whereby the engine type can be identified, in a case where such information is not available from the usual sources.

A further technical feature of the apparatus of the present invention which is of technical significance with respect to the above-discussed state of the art concerns an inherent characteristic of the technique of vibrational signature recognition. This characteristic is the fact that such recognition avoids the need to eliminate significant parts of the vibrational output in order to detect rotational speed, and avoids the need to use integrator apparatus, as employed in the above-discussed Hicho reference. The avoidance of the use of an integrator has significance in relation to tachometer apparatus intended primarily for automotive engine use, due to the low amplitude of the vibrational signals available to be sensed. In many cases, the use of an integrator in vibration-based analysis of an automotive engine would lead to insufficient signals for tachometric purposes. By utilising the technique of spectrometric vibrational harmonic signature recognition, whereby the harmonic signature is tracked across the speed range, the invention side-steps this difficulty and is able to offer apparatus having sufficient sensitivity for even the most well balanced engines available in the automotive field.

It was originally believed that the sensed engine vibration was caused by inertia forces due to the reciprocation of the engine pistons. However, since a six cylinder engine is totally balanced to second order in its inertia forces and yet can still be seen to vibrate, it is apparent that the dominant source of vibration arises from torsional variations in the crankshaft as a result of the combustion process and the inherent reciprocating nature of the engine.

In general terms, the tachometer operates by spectrally analysing the sensor or accelerometer output signal, identifying a speed-related component in terms of the spectral "signature", and uses the instantaneous position of the relevant portion of the signature to determine the engine speed. The signature contains dominant peaks found to be situated at multiples of the engine's crankshaft revolution frequency, and these can be readily identified within the power spectral density across a wide range of engine speeds.

Generally, it was found that for a vehicle with n cylinders, the engine speed was related to the dominant frequency in the power spectral density (f hertz) by :

$$rpm = 60 \times 2/n \times f$$

Subsequent major peaks are also seen at 2f hertz and 3f hertz representing harmonics of the fundamental. Such a signature is described as a "one-two-three signature". There is described and illustrated below a typical example of a power spectral density plot for a four cylinder engine. It is found that different engine configurations have corresponding forms of signature. For example, for a "V" configuration, a dominant peak at half engine speed may occur, with subsequent major peaks at engine speed and twice engine speed, giving a "one-two-four" signature. An example of such is described and illustrated below.

In the embodiments of the invention, the design philosophy with respect to the vibration sensor was firstly to minimise the electronics in the sensor head in order to limit physical size, and secondly to perform as much of the signal processing by software provision so as to maintain maximum control over the system performance.

A further aspect of the invention relates to a diagnostic function arising from the ability of the software system forming part of the analysis function to anaylse the engine vibration signature, taking account of the known harmonic characteristics of the engine configuration in question. Accordingly, the software system can be readily adapted to identify the presence (if any) of additional peaks or the absence of expected peaks in the pattern or signature produced by the engine, such additional peaks corresponding to faults arising from a variety of possible causes, mostly combustion-related.

In accordance with this aspect of the invention there is provided a method and apparatus for machine analysis wherein the signal from vibration sensor means is analysed to identify the presence (if any) of additional peaks or the absence of expected peaks in the pattern or signature expected from the machine in question, whereby such additional peaks provide an indication of identifiable machine faults.

A still further aspect of the invention relates to the arrangements for transmission of signals from the vibration sensor to the corresponding signal analysis apparatus and the general arrangements for processing of the signals whereby the use of the apparatus is rendered convenient and manageable in the confined location of an automotive engine bay.

There is disclosed in EP-B-0 458 053 (Bosch) a motor vehicle test unit in which convenience of operation is provided by means of an arrangement in which the main body of the test apparatus is located in a substantial mobile base unit and this base unit is connected by a manoeuvrable boom arm to a sub-unit which includes control and display means enabling control of the test functions and display of measured values. The sub unit is connected to the automotive engine or other equipment under test by means of short conductor leads from the locally-positioned sub unit, whereby convenience of operation is provided.

The arrangement disclosed in the above-mentioned EP specification does have certain advantages in terms of enabling convenient location of the sub unit close to the equipment under test, and convenient location also of the main processing equipment in the base unit which is located in a relatively remote position, but connected to the sub unit by the boom arm. Likewise, the use of short connecting leads from the sub unit to the engine under test enables the connection function to be performed with a minimum of conductor length and risk of entanglement, nevertheless, there are disadvantages of this arrangement.

Notably, these disadvantages include the fact that the presence of the base unit and its boom arm represents a physical impediment to other operations on the equipment. Additionally, the use of such an arrangement for the mounting of vibration-sensitive equipment would raise various mechanical difficulties in terms of mechanical isolation of the sensor head.

An object of this aspect of the present invention is to provide a method and apparatus for convenient sensing of mechanical or electrical or other operating parameters of an automotive or other power driven installation, without the inherent disadvantages of the conventional or known cable connection systems and base unit/boom/sub unit systems.

According to this aspect of the present invention there is provided a method and apparatus as defined in the accompanying claims comprising wireless transmission means adapted to transmit said signal from said sensor means in analogue form on a radio frequency data-modulated carrier. This analogue signal is received by a base unit at a convenient remote location and converted to digital form before the signal is analytically processed.

Conventional techniques for such data transmission use digital signals with attendant cost and power disadvantages. Known compact non-digital RF transmission/reception apparatus used in alarm control equipment transmits minimal control data (eg alarm on/off signals) and thus merely provides a remote control function.

By transmitting the vibration data signal in analogue form on an RF carrier using amplitude modulation (for example), relatively simple radio frequency transmission apparatus can be employed, without the need for digital conversion and the inherent power consumption arising therefrom. This enables the sensor head to be relatively small and low in power consumption whereby convenience of operation is assured and interference between the sensor head and other structures can be minimised or avoided.

Embodiments of the invention will now be described by way of example with reference to the accompanying drawings in which.

Figure 1:
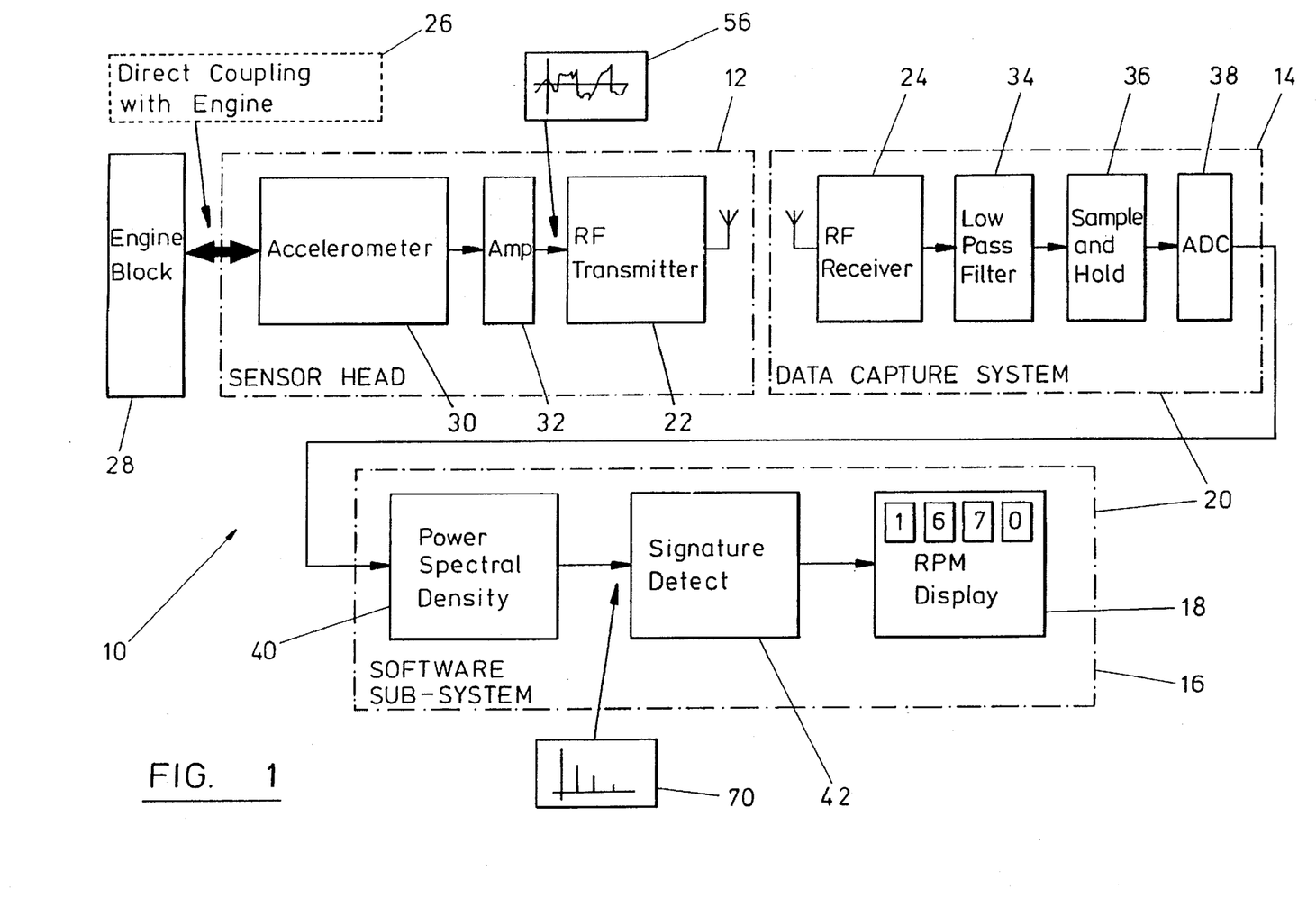
FIG. 1 shows in block diagram form a first embodiment of the invention.

As shown in FIG. 1, apparatus 10 for rotary machine analysis, and particularly adapted for engine analysis, whereby the analytical function is capable of providing tachometric data, comprises principal functions of a sensor head 12, a data capture system 14 and a software sub-system 16 including a display function 18.

Data capture system 14 and software sub-system 16 constitute a single unit of the entire apparatus 10, namely a signal processing and display unit 20, which receives signals from sensor head 12 from a radio frequency wireless transmitter device 22 (forming part of sensor head 12). A corresponding radio frequency wireless transmission receiver device 24 is provided as part of data capture system 14 to receive the corresponding RF signals. This RF simplex data link, comprising the receiver/transmitter pair 22, 24 is licensed for use in both UK and elsewhere in Europe for the transmission of non-speech analogue signals. The band width of the receiver/transmitter pair allows connection to the signal processing and display unit 20 of up to 4 sensor heads 12 in multiple channels.

Turning now to further details of the above-mentioned main elements of the system, we consider first sensor head 12.

As indicator at 26, a direct coupling is provided between sensor head 12 and engine block 28. The mode of coupling will be described further below. Sensor head 12 comprises an accelerometer 30, an amplifier 32, and the above-mentioned transmitter 22.

Data capture system 14 comprises firstly the above-mentioned RF transmission receiver device 24, together with a low pass filter 34, a sample and hold device 36, and an analogue-to-digital converter or ADC device 38.

Software sub-system 16 comprises, in addition to display function 18 mentioned above, a power spectral density function 40 and a signature detect function 42.

In broad outline, the method of the invention comprises using sensor head 12 to generate a signal related to sensed vibrations by installing the sensor head on engine block 28. The signal produced by sensor head 12 is analysed to determine the rate of rotation of engine 28. This is done by subjecting the signal from sensor head 12 to a method of tachometric analysis based on the vibration-generated signal. The analytical technique deals with the plurality of waveforms produced by the sensor head by recognising a pattern or signature having a harmonic content therein which is characteristic of the configuration of engine being analysed. The signal obtained from data capture system 14 is subjected to power spectral density processing by function 40 and the characteristic engine signature in the resulting plot is recognised by signature detect function 42, whereby the particular peak corresponding to engine speed can be identified by reference to the relevant harmonics and the engine speed therefore displayed by RPM display function These elements of the apparatus 10 will now be considered in more detail.

Considering first engine block 28, the typical in-use situation for the tachometric apparatus will be in an analytical function in relation to an engine block 28 of known configuration eg four cylinders in-line or six cylinders in V-configuration (V6), or V8 etc.

In some uses of the apparatus 10, the engine configuration may not be known and in such a situation the vibration data obtained may nevertheless be capable of analysis to determine not only the configuration itself (by recognition of the engine's signature) but also the engine speed in a subsequent step.

Figure 2:
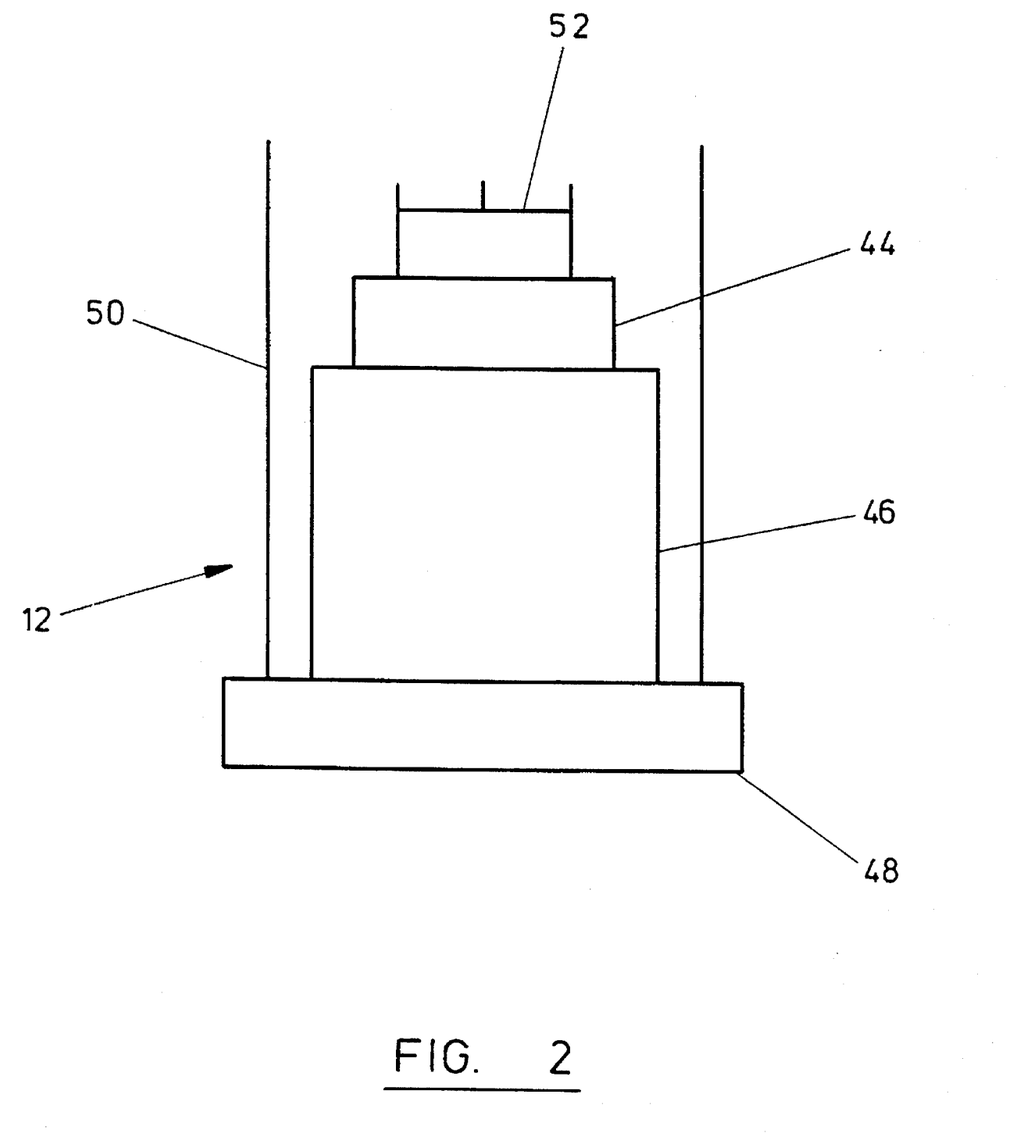
FIG. 2 shows some constructional relationships of the sensor head assembly forming part of the apparatus of FIG. 1.

Some details of the construction of the sensor head are shown in FIG. 2, namely an accelerometer 44, a thermally insulating mounting 46 for the accelerometer, a magnet 48, an insulation tube 50 and a combined amplifier/RF transmitter/antenna unit located on top of accelerometer 44. It will be understood that the combined unit 52 corresponds to the functions 32 and 22 identified in FIG. 1.

As regards accelerometer 44 itself, this comprises two main elements, namely a mass which when subjected to an acceleration produces a force, and a Kynar piezo film transducer, to convert the force to an electric charge. The transducer is mounted on a ceramic substrate (not shown). This transducer construction was chosen for its wide frequency range from 5 hertz to 10 kilohertz, with a linear response characteristic (plus or minus one per cent). The construction of the accelerometer also lends itself to low cost production.

Accelerometer 44 is firmly mounted on the short length of thermally insulating mounting 46 which is itself firmly bonded to a samarium cobalt magnet, of pull strength 15 kilograms, which allows attachment of the sensor head to engine blocks of almost all kinds, due to the usual availability of steel bolt heads even on alloy engines. Magnet 48 is of annular "pot type" construction.

An insulating cylinder is likewise bonded to magnet 48 to isolate accelerometer 44 from electrical contact with (or indeed excessively close proximity to) other electrical systems in the engine compartment.

Thus, accelerometer 44 comprises a piezoelectric film sensor and may have a buffered output. Other mechanical forms of accelerometer structure eg a mechanical diaphragm etc are also acceptable. It is important to choose a sensor having the appropriate level of sensitivity so as to produce the requisite amplitude or range of signals for analysis. In this regard, it is of significance that the vibrational signals available from some well-balanced automotive engines are of such low amplitude as to raise significant difficulties if known vibrational analysis equipment (as discussed above in relation to the prior art) were employed.

As regards amplifier/transmitter/antenna unit 52, the construction of this may be based upon a known receiver/transmitter pair, for example as used for the transmission of unmodulated RF signals for alarm activation purposes, and therefore circuit data is not provided herein.

Accordingly, amplifier/transmitter/antenna unit 52 can be an adapted off-the-shelf radio link device of the alarm signal transmission kind incorporating a signal amplifier and further modified by the addition of modulation means whereby the RF signal is transmitted in amplitude or frequency-modulated form(preferably amplitude-modulated) so as to carry the vibrational signal data.

In this manner, the requirements for extremely simple and low cost radio transmission are met, together with the corresponding requirement for compact and lightweight form, for direct mounting on engine block 28. Moreover, in the same way as alarm signal transmission devices have been developed with extremely low power consumption requirements, the adaptation of such a device for this purpose enables this corresponding advantage to be provided also. Thus, sensor head 12 can operate as a self-contained battery-operated unit which mounts directly on engine block 28 by magnetic means 48 with a potentially relatively long self-powered life based on a relatively small battery supply. This enables the signal processing and display unit 20 to be located at any convenient position in the vicinity of sensor head 12, but without any electrical conductors therebetween.

Turning now to data capture system 14, it will first be noted that the RF receiver unit 24 complements the transmitter device 22 discussed above and is of corresponding construction, adapted to receive the modulated signal from transmitter 22 and to pass same to the low pass filter 34 and hence to sample and hold device 36 and thus onwards to the ADC unit 38.

Thus, data capture system 14 takes the raw signal produced by sensor head 12 and converts its into digital form, and stores it in memory prior to digital signal processing.

Low pass filter 34 is of significance in that it represents the only filter function needed by the apparatus 10. Filter 34 is an anti-aliasing filter. The anti-aliasing filter removes frequencies which would otherwise be changed by the sampling rate of the ADC unit. Otherwise however the system 10 is not dependent upon filter functions, and notably does not use these at all for the purposes of signal analysis and identification of tachometric data.

Sample and hold function 36 stores the signal data in memory prior to digital signal processing, The ADC function comprises a 12 bit analogue-to-digital processor which allows the analogue data to be quantised into 4096 voltage steps. The data capture system runs in parallel with the signal processing software sub-systems 16, allowing the display function 18 to be updated twice a second. In other words, the RPM-tracking capability oft he apparatus 10 in this embodiment can display up to 120 different numerical values for engine speed per minute, whereby relatively rapid response to changing engine speeds, as needed for modern engine-speed-dependent quantitative tests (such as emission analysis) is provided.

Turning now to the software. sub-system incorporating display function 18, it will be noted that this system receives digital data from ADO unit 38. Power spectral density function 40 subjects the quantised digital signal to a fast fourier transform routine in order to generate the power spectral density data therefrom, for analytical purposes. The power spectral density analysis function carried out in software sub-system 16 may use a well recognised algorithm (see eg "Numerical Recipes in C" published by Cambridge University Press). The plurality of superimposed waveforms present in the data input to software sub-systems 16 is indicated in the micro-plot 56 in FIG. 1. This is shown as the output of amplifier unit 32, but is likewise representative of the input to the software subsystem 16.

Figure 3:
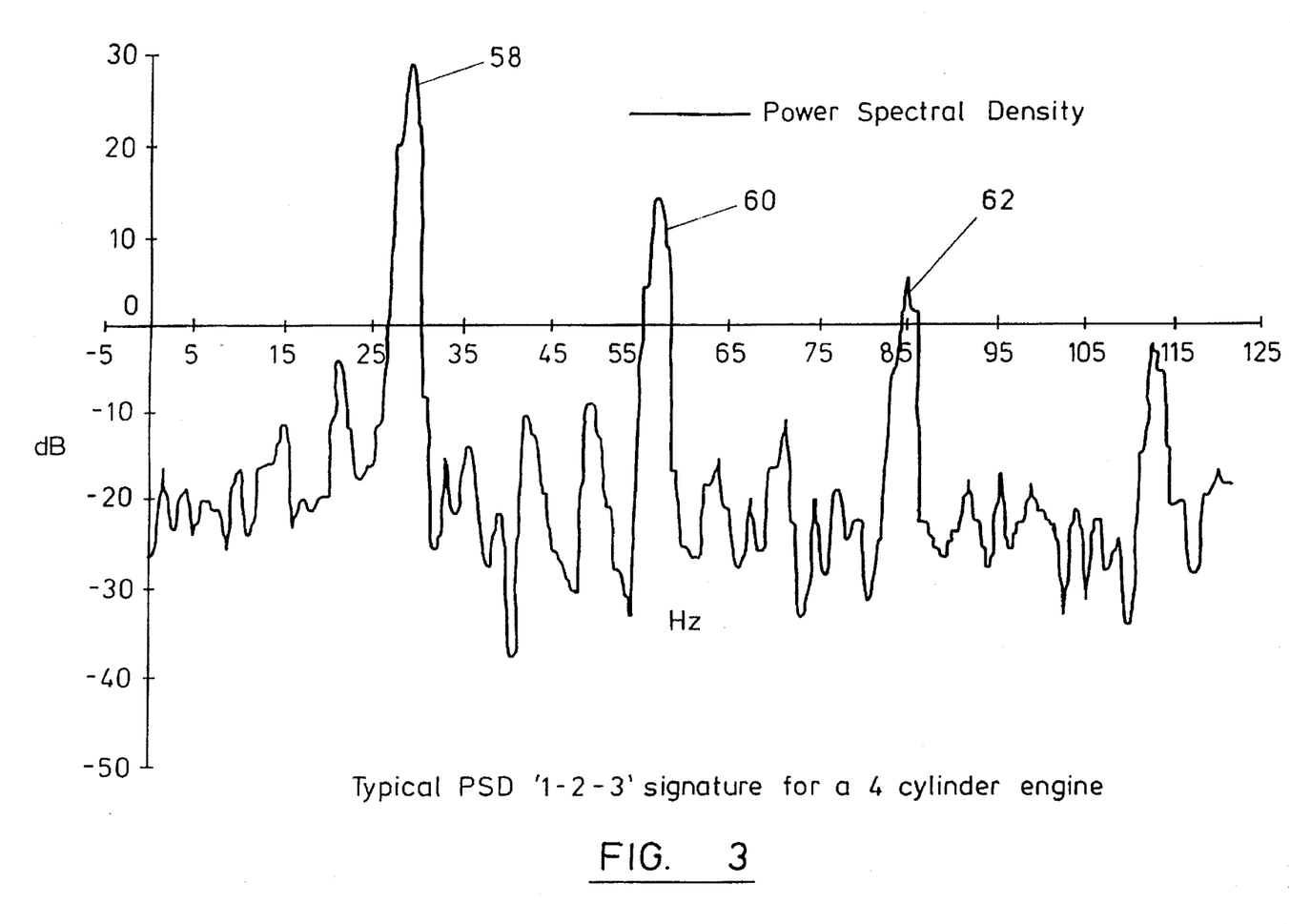
FIG. 3 shows a plot of power spectral density against frequency as produced by the system of Pig I in the software sub-system, this plot requiring detection of the relevant signature (in this case a four cylinder engine) by the signature detect function also provided in the software sub-system.

FIG. 3 shows the resultant power spectral density "PSD" data obtained for (in this case) a four cylinder engine.

As a general rule, it is found that for a vehicle with n cylinders, the engine speed is related to the dominant frequency peak in the PSD plot, namely f hertz, by the equation :

$$rpm = 60 \times 2/n \times f.$$

Subsequent major peaks are also seen at 2f hertz and 3f hertz, these representing harmonics of the fundamental. Such a relationship between these harmonic elements of the PSD plot is described as a "1-2-3" signature. FIG. 3 shows such a signature for a four cylinder engine including peaks 58, 60 and 62 corresponding to f (engine speed) and 2f and 3f respectively.

Figure 4:
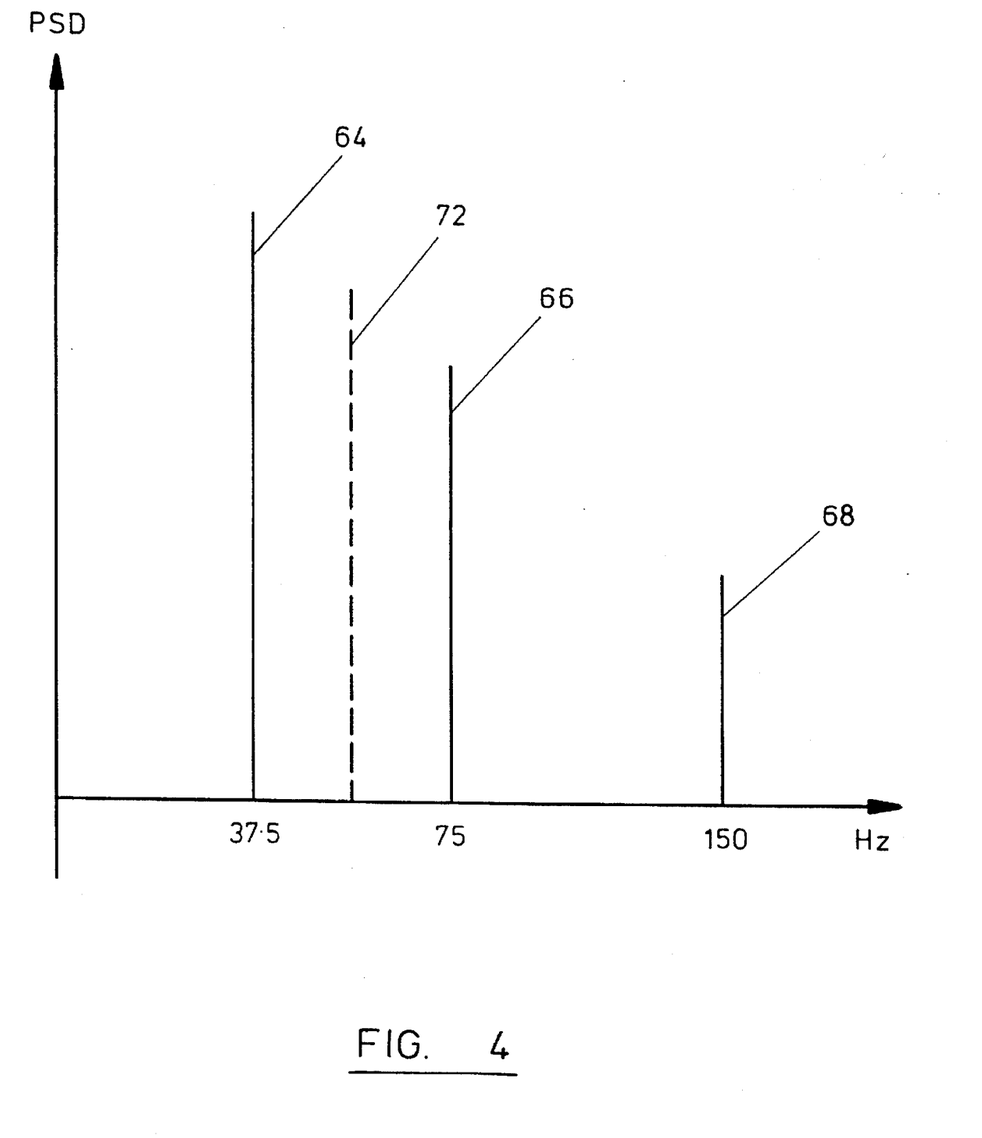
FIG. 4 shows an engine "signature" extracted from a power spectral density plot of the kind shown in FIG. 3 and showing the characteristic frequencies and corresponding amplitudes of the relevant three peaks, in this case for a six cylinder engine. A misfits peak is also indicated.

It has been found that for certain other engine configurations, significantly different forms of signature are observed. Thus, for a V6 engine, a dominant peak at 0.5f hertz may occur, with subsequent major peaks at f and 2f, giving a "1-2-4" signature. FIG. 4 shows an idealised signature for a V6 engine running at 1500 rpm with peaks identified at 64, 66 and 68.

Turning now to the method for obtaining numerical data from the peak data discussed above, we now discuss the signature detect function 42, which carries out a peak search routine using an algorithm selected in accordance with the engine type, which is known from data relating to engine block 28.

Broadly, signature detect function 42 subjects the power spectral density data, such as that shown in FIG. 3 to an analysis routine corresponding to the engine configuration in question and enabling identification of the relevant peak (or a related peak) corresponding to the engine rpm frequency "f" for the engine in question. In the case of-FIG. 3, the peak in question for the 1-2-3 signature of a 4 cylinder engine is known to be peak 58 which is at a multiple of engine speed. In the case of the V6 engine of FIG. 4, since peaks 64, 66 and 68 are at 0.5 f and f and 2f, actual engine speed is given by peak 66. Other relationships exist for other engine configurations.

In FIG. 1, the micro-plot 70 indicates the "signature" which can be obtained from the relevant peaks in the power spectral density plot produced by PSD function 40, which signature is subjected to the analysis routine described herein and performed in signature detect function 42.

SIGNATURE DETECT ALGORITHM

There now follows in pseudo-code an abbreviated statement of the base algorithm for the signature detect function.

The following statement of pseudo-code functions can be readily expanded to a full functional statement and converted by a person skilled in the art to machine code accordingly.

```
BASE ALGORITHM

Acquire signal samples data
while measurement required
            Calculate PSD
            Perform peak search for three largest peaks
            identify spectral signature
            convert to engine speed value
            Acquire more data
endwhile
```

The signature detect function 42 thus enables identification of the relevant key engine signature peak which provides the engine RPM for display unit 18, thus enabling display of the engine RPM by display unit 18.

It has been found that the apparatus 10 operates successfully on a wide range of both petrol and diesel four cylinder engines, for speeds ranging from tick over at 700 RPM to operation up to 5000 RPM. Illustrative results from test work are shown in the following tabulations. In these, the engine RPM obtained by the apparatus 10 and displayed by display function 18 is shown in the lower horizontal column in each case. The upper horizontal column shows the engine speed set by an existing tachometric system (identified as "prior system"). The numerical values given for the prior system should be interpreted as values at which the engine was held on a visual inspection basis to an accuracy of plus or minus 50 RPM.

Table 1 shows the results for a four cylinder diesel engine, table 2 for a four cylinder petrol engine and table 3 for a six cylinder diesel engine. These tabulations were obtained with the sensor head 12 mounted on the engine using the magnetic attachment system described above, It was considered best to site the sensor head at the end of the engine furthest from the fly wheel/gear box assembly in order to minimise the vibration-damping and torque-smoothing effects of these.

Locations for the sensor head 12 other than direct mounting on the engine block were tested, including the engine compartment slam panel (usually at radiator location, to take downward slam of closing engine compartment bonnet/hood)/. Table 4 shows the results for the slam panel test for a petrol engine.

TABLE 1

RESULTS FOR FOUR CYLINDER DIESEL

| Idle 834 | 1000 | 1250 | 1500 | 1750 | 2000 | Prior system |
|---|---|---|---|---|---|---|
| 844 | 1012 | 1260 | 1509 | 1765 | 2019 | Invention |
| 2500 | 3000 | 3500 | 4000 | 4500 | | Prior system |
| 2511 | 3015 | 3470 | 3947 | 4450 | | Invention |

TABLE 2

RESULTS FOR FOUR CYLINDER PETROL

| Idle 800 | 1200 | 1600 | 1800 | 2000 | 2500 | 3000 |
|---|---|---|---|---|---|---|
| 812 | 1204 | 1610 | 1804 | 2009 | 2507 | 2985 |
| 3500 | | 4000 | | Prior System | | |
| 3449 | | 3943 | | Invention | | |

TABLE 3

RESULTS FOR SIX CYLINDER DIESEL

| Idle 764 | 1000 | 1250 | 1459 | 1767 | 1979 | Prior System |
|---|---|---|---|---|---|---|
| 773 | 1018 | 1264 | 1465 | 1785 | 1942 | Invention |
| 2500 | 3000 | 3500 | 4000 | 4500 | | Prior System |
| 2470 | 2975 | 3472 | 3984 | 4486 | | Invention |

TABLE 4

RESULTS FOR FOUR CYLINDER PETROL ON SLAM PANEL

| Idle 800 | 1200 | 1600 | 1800 | 2000 | 2500 | 3000 |
|---|---|---|---|---|---|---|
| 805 | 1204 | 1599 | 1815 | 2007 | 2511 | 3000 |
| 3500 | | 4000 | | Prior System | | |
| 3464 | | 3954 | | Invention | | |

Diagnostic functions for the basically tachometric apparatus 10 have also been identified and tested. Thus, for example, in the PSD plot of FIG. 4, there has been added in broken lines an additional peak 72 centrally between the peaks 64 and 66. Such an additional peak is produced by a cylinder misfits and has been found to be characteristic of such a combustion-related fault. Since, by selection of the appropriate algorithm for the signature detect analysis at function 42, it is already known what pattern of peaks to expect for a given engine, the location and identification of additional peaks represents a relatively straightforward function enabling fairly specific identification of engine function-related faults. Likewise, absence of an expected peak can also be identified and has been found to be likewise related to similar faults- Related conditions which have been found to be identifiable in a similar manner include engine wear (again by abnormal frequency peak detection), idle stability (by identifying trends in idle speed), wheel balancing (by detection of low frequency peaks), engine knock-sensing (by high frequency event analysis).

Figure 5:
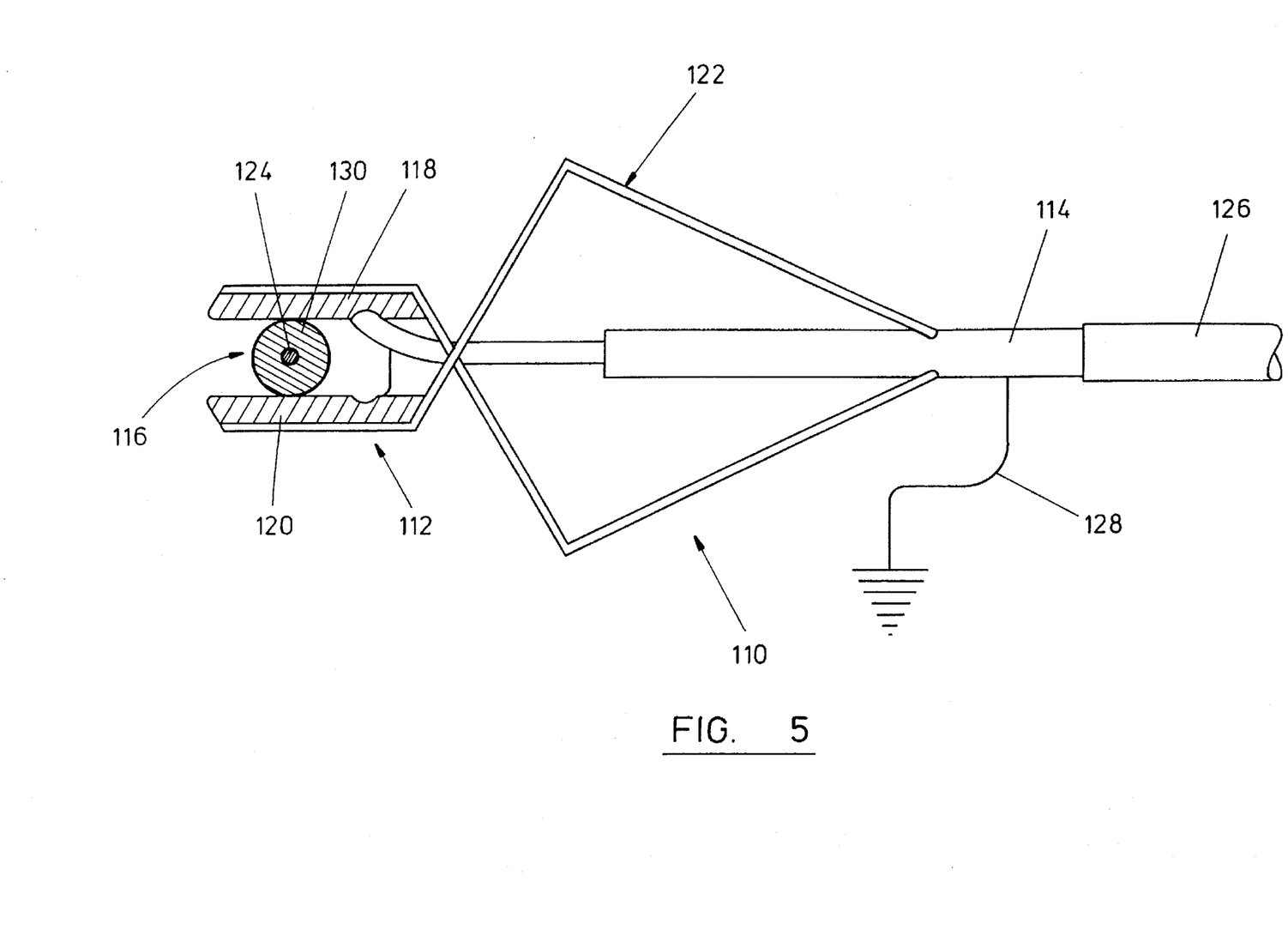
FIG. 5 shows an elevation view of a capacitive clamp for capacitive cooperation with the injector lead of a spark ignition engine for analytical purposes, and forming a further embodiment of the invention.

Turning now to the embodiment of FIG. 5, this embodiment provides an alternative sensor device to replace the vibration sensor of the above-described embodiments.

In this embodiment, the analysis apparatus 110 comprises a sensor head 112 connected by a conductor 114 to a data capture and analysis function (not shown).

The data capture and analysis function could be the apparatus of the above-described preceding embodiment, but could equally be considerably simplified with respect thereto.

Thus, sensor head 112 is adapted to be connected to a lead 116 to an injector of a spark ignition engine or a related low voltage lead such as a lead to a crankshaft sensor or to a spark ignition primary coil. Such a lead provides a low voltage and engine-speed-related signal offering the possibility of obtaining a simple and directly interpretable signal for determination of engine speed.

In accordance with this aspect of the present invention sensor head 112 is provided with capacitor elements 118, 120 which are adapted to be located in relation to the injector lead 116 so as to form a capacitive coupling thereto.

Capacitor elements 118 and 120 are in the form of plates which are spring-biased as the Jaws of a clamp 122 and can thus be clamped onto injector lead 116 in the indicated relationship to the central conductor 124 therein.

Elements 118, 120 are connected by a screened cable 126 to the data capture and analysis function. Cable 126 is grounded at 128 to the engine on to test.

In use, a capacitive coupling is provided to the injector lead 116. Capacitor elements 118, 120 are spaced from conductor 124 by the thickness of the insulation 130 of injector lead 116. The other connection of screen cable 126 is to the engine itself. The resultant signal is clear and needs only a simple amplifier for inputting the signal to a display function. This can be of known kind and does not require the analytical functions of the preceding embodiments.

Amongst modifications which could be made in the above embodiments while remaining within the scope of the invention are the use of various different kinds of vibration sensing devices, alternative systems for transmission of data from the vibration sensor to the analytical function, modifications to this latter function in terms of its software content, or indeed the use of additional hardware in cases where it is wished to reduce the software element.

We claim:

1. A method of tachometric engine analysis adapted to measure and indicate engine rotation rate over a tachometric engine speed range, said method comprising the steps of:
   (a) providing vibration-responsive sensor means adapted to generate a signal related to sensed vibrations;
   (b) installing the vibration-responsive sensor means in relation to an engine to be analyzed so as to sense and respond to vibrations caused by engine operation to produce a signal including a plurality of waveforms constituting a recognizable pattern or signature having a harmonic content characteristic of the configuration of the engine being analyzed;
   (c) tracking the signal over the tachometric engine speed range;
   (d) analyzing the signal to recognize the vibration pattern or signature and accordingly identify the corresponding engine type; and
   (e) analyzing the harmonic content of the pattern or signature by an algorithm adapted to identify the particular peak corresponding to engine speed, or a related peak, by reference to the relevant harmonics thereof in the signature to provide a substantially real-time indication of engine speed over the tachometric engine speed range.

2. The method of claim 1, wherein the digital analysis of the signal includes a fast Fourier transform routine adapted to produce a power spectrum density from the signal and containing the peak and its harmonics, and identifying the relative peaks in the power spectrum density.

3. The method of claim 1, wherein the installing step includes attaching the vibration-responsive sensor means directly to the engine or structure connected thereto via magnetic means.

4. The method of claim 1, wherein the step of analysis of the harmonic content includes identification of the presence (if any) of an additional peak or the absence of an expected peak in the pattern or signature of the engine, the additional peak or absent peak corresponding to a combustion-related fault in the engine.

5. The method of claim 1, and further comprising the step of wireless transmission of the signal from the vibration-responsive sensor means to apparatus for performing the digital analysis, in the form of an analog modulated radio frequency signal.

6. The method of claim 5, and further comprising the step of converting the received analog signal to digital form prior to the analyzing steps.

7. Apparatus for tachometric engine analysis adapted to measure and indicate engine rotation rate over a tachometric engine speed range, said apparatus comprising:
   (a) vibration-responsive sensor means adapted to generate a signal related to sensed vibration;
   (b) mounting means adapted for mounting said vibration-responsive sensor means in relation to an engine to be analyzed so as to sense and respond to vibrations caused by engine vibration to produce a signal including a plurality of waveforms constituting a recognizable pattern or signature having a harmonic content characteristic of the configuration of the engine being analyzed; and
   (c) signal analysis means coupled to said sensor means for tracking the signal over the tachometric engine speed range, said signal analysis means including processing means operating under stored program control for recognizing the vibration pattern or signature and accordingly identifying the corresponding engine type, said processing means including means for analyzing the harmonic content of the pattern or signature by an algorithm adapted to identify the particular peak corresponding to engine speed, or a related peak, by reference to the relevant harmonics thereof in the signature to provide a substantially real-time indication of engine speed over the tachometric engine speed range.

8. The apparatus of claim 7, wherein said processing means includes means adapted to perform a fast Fourier transform routine to produce a power spectrum density from said signal containing said peak and its harmonics, said processing means further including means adapted to identify the relevant peaks in said power spectrum .density.

9. The apparatus of claim 7, wherein said mounting means includes magnetic means to mount said vibration-responsive sensor means directly on the engine being analyzed.

10. The apparatus of claim 7, wherein said processing means includes means adapted to identify the presence (if any) of an additional peak or the absence of an expected peak in the pattern or signature, said additional peak or absent peak corresponding to a combustion-related fault in the engine.

11. The apparatus of claim 7, and further comprising wireless transmission means including a transmitter coupled to said sensor means and a receiver coupled to said signal analysis means and adapted to transmit the signal from the vibration-responsive sensor means to said signal analysis means in the form of an analog modulated radio frequency signal.

12. The apparatus of claim 11, and further comprsing analog-to-digital conversion means coupled to said receiver for converting the received analog signal to digital form for delivery to said signal analysis means.

13. A method of tachometric engine analysis based on vibration sensing and adapted to measure and indicate engine rotation rate over a tachometric engine speed range, comprising the steps of:

tracking a vibration-produced signal including a plurality of waveforms constituting a pattern or signature characteristic of the configuration of the engine being analyzed over a tachometric engine speed range, identifying the engine configuration from the pattern or signature, and analyzing the harmonic content of the pattern or signature so as to enable substantially real-time identification or detection of one or more peaks corresponding to or related to engine speed.

14. Apparatus for tachometric engine analysis based on vibration sensing and adapted to measure and indicate engine rotation rate over a tachometric engine speed range, said apparatus comprising:

vibration sensing means adapted to be coupled to an engine to be analyzed for producing a signal including a plurality of waveforms constituting a pattern or signature characteristic of the configuration of the engine being analyzed over a tachometric engine speed range, and signal analysis means coupled to said sensing means and adapted to track the pattern or signature over the tachometric engine speed range, identify the engine configuration from the pattern or signature and analyze the harmonic content of the pattern or signature to enable substantially real-time identification or detection of one or more peaks corresponding to or related to engine speed.

15. A method of automotive machine analysis comprising the steps of:

(a) providing sensor means adapted to generate, in response to a sensed machine parameter, an analog signal comprising a plurality of waveforms including a pattern or signature characteristic of the machine;

(b) installing the sensor means in relation to a machine to be analyzed;

(c) transmitting the analog signal from the sensor means by wireless transmission of a modulated RF carrier to relatively remote signal processing equipment adapted to perform analysis thereof;

(d) converting the received analog signal to a digital signal; and (e) analyzing the digital signal to identify the machine from the pattern or signature and determine a characteristic of the parameter.

\* \* \* \* \*